J. ALUKONIS.
BICYCLE BELL RINGER.
APPLICATION FILED AUG. 21, 1915.
1,213,058.
Patented Jan. 16, 1917.
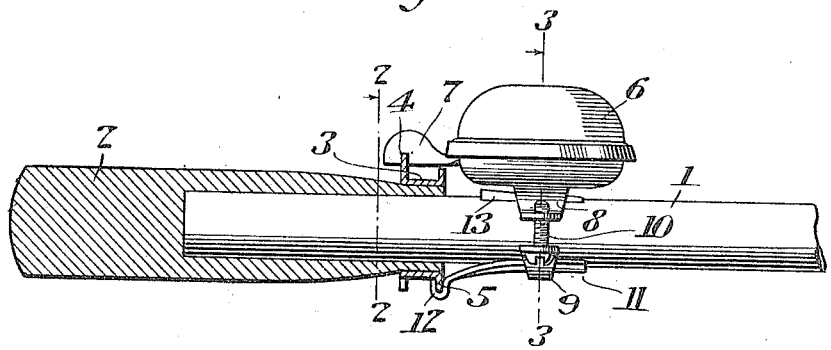
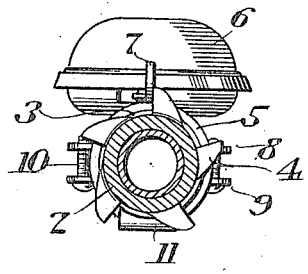
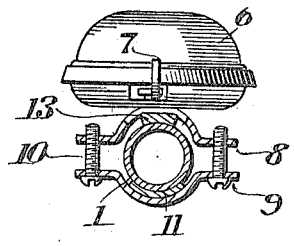
Inventor
James Alukonis
Witnesses
By Victor J. Evans
Attorney

UNITED STATES PATENT OFFICE.

JAMES ALUKONIS, OF NASHUA, NEW HAMPSHIRE.

BICYCLE-BELL RINGER.

1,213,058.　　　　　Specification of Letters Patent.　　Patented Jan. 16, 1917.

Application filed August 21, 1915.　Serial No. 46,749.

*To all whom it may concern:*

Be it known that I, JAMES ALUKONIS, a citizen of the United States, residing at Nashua, in the county of Hillsboro and State of New Hampshire, have invented new and useful Improvements in Bicycle-Bell Ringers, of which the following is a specification.

This invention relates to improvements in alarm bells for bicycles, motorcycles and the like, and especially with reference to the provision of a ringer for actuating the operating arm of a bell of this character and which is operated by a revoluble handle or grip mounted on the handle bar, a further object of the invention being to provide means for holding the revoluble handle and the bell in place on the handle bar.

The invention consists in the construction, combination and arrangement of devices hereinafter described and claimed.

In the accompanying drawings:—Figure 1 is a side elevation partly in section of a handle bar, a revoluble handle, a bicycle bell and operating means therefor, carried by the handle. Figs. 2—3 are transverse sectional views respectively on the planes indicated by the lines 2—2 and 3—3 of Fig. 1.

For the purposes of this specification a portion of the handle bar of a bicycle, motor cycle or the like is indicated at 1. In accordance with my invention, I provide a grip or handle 2 which is mounted for rotation on one end of the handle bar and is provided at the inner end with a head 3 which forms a ferrule, the head being provided at its outer side with radial ratchet tappets 4 and being provided at its inner side with an annular flange 5.

The bell 6 here shown is of the usual form, provided with the usual operating arm 7 and also provided with a clip 8 for attaching the bell to the handle bar, the said clip comprising a pair of members 8—9 which are connected together and clamped at opposite sides of the handle bar by means of bolts 10. I also, in accordance with my invention, provide a holder 11 which is shaped to fit on the under side of the handle bar and is provided at its outer end with a groove 12 which engages the flange of the head 3 so that the holder, by thus engaging the flange of the head, causes the grip or handle to be kept in place on the handle bar while permitting it to be rotated. The holder is clamped between the handle bar and the member 9 of the clip, as shown. I also provide a wedge 13 which is inserted between the clip member 8 and the upper side of the handle bar and which coacts with the clip in firmly securing the bell and holder to the handle bar.

The operating arm of the bell extends across the head and is in the path of the ratchet tappets of the head so that when the handle or grip is turned on the handle bar each of its ratchet tappets engages the arm of the bell and operates the same so as to sound an alarm.

While I have herein shown and described a preferred form of my invention I would have it understood that changes may be made in the form, proportion and construction of the several parts without departing from the spirit of the invention and within the scope of the appended claim.

Having thus described my invention, I claim:—

In combination with a handle bar and a handle revolubly mounted thereon, a head at the inner end of the handle, having radial tappets and also having an annular flange; a holder bearing against one side of the bar and having a grooved end, the groove of which is engaged by the said flange, and a bell having an arm for operation by the tappets and also having an attachment clip, said clip engaging the handle bar and also engaging and securing the holder.

In testimony whereof I affix my signature in presence of two witnesses.

JAMES ALUKONIS.

Witnesses:
　MARKAR G. MARKARIAN,
　EUGENE DESMARAIS.